Jan. 5, 1960 A. P. STERN 2,920,132

COLOR TELEVISION SYSTEM

Filed Dec. 29, 1953 2 Sheets-Sheet 1

Inventor:
Arthur P. Stern,
by Charles M. Hutchins
His Attorney.

COLOR TELEVISION SYSTEM

Filed Dec. 29, 1953 2 Sheets-Sheet 2

Inventor:
Arthur P. Stern,
by Charles M. Hutchins
His Attorney.

United States Patent Office 2,920,132
Patented Jan. 5, 1960

2,920,132

COLOR TELEVISION SYSTEM

Arthur P. Stern, Syracuse, N.Y., assignor to General Electric Company, a corporation of New York Application December 29, 1953, Serial No. 400,856

11 Claims. (Cl. 178—5.4)

This invention relates to electrical apparatus and, more specifically, to electric circuits for incorporation in color television receivers. It has particular application to color television receivers in which the picture tube is of the single-electron-gun type.

The type of color television signal which up to the present time has found the most favor in the industry is a signal composed of three components. The first of these components, which occupies the lower part of the frequency band assigned to color television transmission, is the luminance component, which is expressive only of the brightness, but not the color, of the element of scene being scanned at the time. The other two components are the so-called chrominance components, which are respectively impressed on two subcarrier waves of equal frequency but of ninety-degree phase displacement with respect to each other. These chrominance components carry the color information and occupy the upper part of the frequency band assigned to color television transmission. They may be transmitted in a suppressed-subcarrier fashion. In order to make economical use of the available frequency spectrum, provision has been made for the luminance and chrominance components to overlap each other slightly in the spectrum, a fact which renders detection of the signals slightly more difficult than it would otherwise be. However, since the detection problem can be solved, it is generally felt that the resulting economy in use of the available spectrum justifies the inconvenience caused by frequency overlap. This is particularly true since a certain bandwith of the available transmitting frequency spectrum must be granted to each transmitting station, and it is highly desirable that the width of such channel for color transmission be the same as the width of earlier assigned channels for black-and-white transmission in order to permit compatibility of the color television signal with existing black-and-white, or monochrome, receivers.

Thus, it is seen that the color television signal favored in the industry has been designed mainly with its transmission properties, rather than ease of detection and reproduction of picture, in mind. A further example of this general statement is the fact that, while the commonly accepted color television signal is fairly well adapted for actuating a receiver equipped with a picture tube possessing one electron gun for each of the three primary colors (red, green, and blue), the signal must undergo some type of modification if it is to be utilized for actuating a receiver equipped with a picture tube possessing only one electron gun. Such a receiver has the advantage of greater economy in that the manufacturing thereof is easier, and there is no problem of adjustment to obtain the exact registration of images from three different electron guns. My invention is concerned with the modification or conversion which the color television signal must undergo in order to become suitable for actuation of a color tube of the single-electron-gun type.

A color television signal of the type presently favored in the industry may be described by the following expression:

$$E_m=E_y+K_1(E_x-X_0E_y)\sin(\omega t+\phi)+K_1K_2(E_z-Z_0E_y)\sin(\omega t-\theta) \quad (1)$$

where:

$E_m$ is the composite video signal including both brightness and color information;

$E_y$ is the luminance or brightness signal;

$E_x$ and $E_z$ are voltages proportional respectively to X and Z, the two tristimulus values established by the International Committee on Illumination which relates only to chromaticity, and not to luminance, or brightness; (see Wintringham, "Color Television and Colorimetry," Proceedings of the Institute of Radio Engineers, vol. 39, No. 10, page 1135);

$\omega=2\pi$ times the frequency of the chrominance subcarrier wave, which is approximately 3.58 megacycles per second;

$$K_1=1.67$$
$$K_2=0.30$$
$$X_0=0.98$$
$$Z_0=1.18$$
$$\phi=89/57.3 \text{ radians}$$
$$\theta=30/57.3 \text{ radians}$$

which are constants fixed by the specifications of the television signal favored in the industry; and $t$ is the instantaneous time at which it is desired to measure $E_m$.

Alternatively, the color television signal of the same type may be described by another expression, as follows:

$$E_m=E_y+\alpha(E_R-E_y)\cos\omega t+\beta(E_B-E_y)\sin\omega t \quad (2)$$

where:

$E_m$, $E_y$, $\omega$, and $t$ are as defined above;

$E_R$ is a voltage proportional to the red primary component of color of the element of image being scanned;

$(E_R-E_y)$ is commonly denominated as the red color-difference chrominance component;

$E_B$ is a voltage proportional to the blue primary component of color of the element of image being scanned;

$(E_B-E_y)$ is commonly denominated as the blue color-difference chrominance component;

$\alpha=0.877$; and $\beta=0.493$.

In order further to elaborate on this commonly favored signal specification, $E_y$ may be expressed in terms of the voltages proportional to the primary color components of the element of image being scanned, as follows:

$$E_y=.30E_R+.59E_G+.11E_B \quad (3)$$

where:

$E_y$, $E_R$ and $E_B$ are as defined above; and $E_G$ is a voltage proportional to the green primary component of color of the element of image being scanned.

It will be noted that these equations do not take into consideration the so-called "gamma" pre-correction for picture-tube non-linearity.

The color television signal as specified by Equations 1, 2, and 3 is favored in the industry because its transmission characteristics are good. Specifically, such a signal permits the transmission thorugh a limited-band-width channel of information sufficient to produce an image roughly equivalent in its luminance detail to the visual image produced by a black-and-white picture receiver, together with sufficient color information to tint the received image satisfactorily. In other words, this signal specification is favored because it is such as to permit economy in the use of a limited channel spectrum and minimum interference between luminance and chrominance components of the signal, and because it is such as to permit monochrome receivers in common use, as well as color receivers, to derive an acceptable image therefrom. Although this signal specification is very satisfactory as to its information-transfer properties, it happens to be such as to present certain difficulties in sampling, and resolution of the color components, particularly where a color picture tube of the single-electron-gun type is to be utilized. These difficulties result from the fact that such a tube can have only one signal at a time applied to its grid and the fact that such a signal should be at least approximately expressive of each of the color components of an element of image in sequence. The signal specified by Equations 1, 2, and 3, while in a sense sequential, is not at any one time expressive of a single color component of an element of image.

Accordingly, a principal object of my invention is to provide a means for transforming the signal as specified by Equations 1, 2, and 3 to create a signal which is approximately sequential in nature.

A specific object of my invention is to provide a means for transforming the signal as expressed by Equations 1 or 2 into a signal reasonably suitable for application to a color-television picture tube of the single-electron-gun type.

A further specific object of my invention is to provide a means for transforming a signal expressible by an equation similar to Equation 1 or 2 into a signal resolvable without great inaccuracy into its chrominance components, the resolution being performed by a process of sampling at equal time intervals.

Briefly, the apparatus which I have invented adds to a modified version of the signal described by Equation 1 or 2 another signal derived from the signal described by Equation 1 or 2. This other signal may be generated from the luminance component $E_y$ by a balanced modulator driven by a wave of frequency $\omega$ and of appropriate phase. The design of the apparatus of my invention is such that the sum of the modified version of the signal $E_m$ and of the signal derived from the luminance signal $E_y$ may be sampled at equal time intervals, or symmetrically, without causing great inaccuracy of reproduction.

For additional objects and advantages, and for a better understanding of my invention, attention is now directed to the following description and the accompanying drawings. The features of the invention which are believed to be novel are pointed out with particularity in the appended claims.

In the drawings:

Fig. 1(*b*) is a vector diagram showing the phase angles (relative to an arbitrary phase reference) which characterize the vector sum of the two chrominance component signals for pure red, pure green, and pure blue, respectively;

Although much work in the field of color television has been done with receiver picture tubes using an electron gun for each of the three primary colors (red, green, and blue), certain advantages reside in receiver picture tubes having only a single electron gun. Such advantages include the features of decreased manufacturing cost, and absence of the problems inherent in obtaining the exact coincidence of the images from three electron guns. However, a picture tube with a single electron gun, or single-gun tube, must be actuated by a signal which is at least approximately expressive of the three primary-color components of the image in sequence. In other words, since a single-gun tube can be controlled by only one signal voltage at a time, the three primary-color signal voltages cannot be supplied to the tube simultaneously but must be supplied in a nearly sequential manner. Further, some color control mechanism must be provided, in order to insure that the electron beam of the color tube is at all times directed toward a screen phosphor which will glow in a color corresponding reasonably well with the color signal which is at that instant controlling the tube. Such a color control mechanism may comprise a variably-charged mesh of deflecting grid wires so arranged as to deflect the electron beam to the proper phosphor on the face of the tube. Alternatively, the color control mechanism may comprise any other suitable means for directing the electron beam to the proper phosphor corresponding to the color represented by the tube-actuating signal at that instant. The details of such color control mechanisms are beyond the scope of my invention, which pertains to the signal-transformation means required in order to obtain a signal which may be sampled symmetrically without great inaccuracy.

The possibility of such symmetrical sampling means that the third harmonic of the frequency $\omega$, as defined above, can be used as the sampling wave which establishes the times for sampling the signal delivered to the single-gun color tube. Thus, the sampling wave can be easily obtained in the receiver by tripling the frequency $\omega$, which can in turn be obtained from the "color burst" or waveform of frequency $\omega$ which is commonly transmitted between every two lines of color television picture signal as the image is scanned, line by line. Again, the derivation of the sampling wave is outside the scope of my invention, which pertains to the apparatus and process for putting the color television signal in condition for sampling.

Figure 1B:
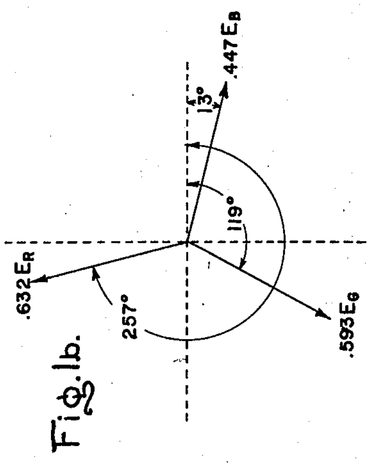
Fig. 1(*a*) is a vector diagram showing the nature of the phase relationship between the chrominance component signals.
Figure 1A:
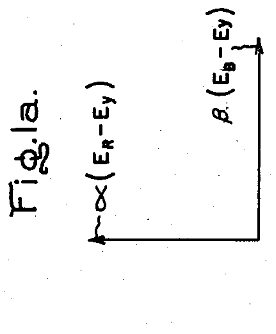

Turning to Figure 1(*a*) of the drawings, there is a vector diagram based upon a graphical representation of the chrominance portion of the signal specified by Equation 2. That is, the sum of the instantaneous values of the projections on the X-axis of the vectors marked $\alpha(E_R-E_y)$ and $\beta(E_B-E_y)$ is the instantaneous value of the chrominance signal, which may be denominated $E_c$. If the signal $E_c$ were to be separated from the luminance component $E_y$ of the composite video signal $E_m$, and if $E_c$ were to be sampled at angles 120 degrees apart without any prior transformation thereof, an obvious inaccuracy in color reproduction would be present even if $E_y$ were added to each of the sample outputs. For instance, it is clear that, in order to detect $(E_R-E_y)$ and $(E_B-E_y)$ properly, they would have to be sampled at instants 90 degrees, rather than 120 degrees, apart.

If it is permissible to tolerate some inaccuracy to detection in order to have the convenience of symmetrical sampling, $E_c$ may be sampled symmetrically at angles $(\theta_R+\Delta\theta_R)$, $(\theta_G+\Delta\theta_G)$ and $(\theta_B+\Delta\theta_B)$ instead of at the respective proper angles $\theta_R$, $\theta_G$, and $\theta_B$. If that is done, the detected values will be respectively the following ones:

$$[E_R+.008\ \Delta\theta_R(E_B-E_G)-E_y]$$

instead of $[E_R-E_y]$, and $$[E_G+.005\ \Delta\theta_G(E_R-E_B)-E_y]$$

instead of $[E_G-E_y]$, and $$[E_B+.021\ \Delta\theta_B(E_G-E_R)-E_y]$$

instead of $[E_B-E_y]$.

In the above expressions for the quantities which would actually be detected, if symmetrical sampling of $E_c$ were employed, the approximation that $\Delta\theta\approx\sin\Delta\theta$, for small angles, has been relied upon. In each of the above expressions, the terms containing $\Delta\theta$ represent the crosstalk or inaccuracy resulting from the symmetrical sampling. It will be noted that a sampling angle displaced a given angle $\Delta\theta$ from $\theta_B$, the proper sampling angle for $[E_B-E_y]$, causes more than four times as much crosstalk as does a sampling angle displaced the same given angle, $\Delta\theta$, from $\theta_G$, the proper sampling angle for $[E_G-E_y]$. Therefore, it would seem advantageous to sample for $[E_B-E_y]$ at the angle $\theta_B$, thereby eliminating all crosstalk from $$[E_B-E_y]$$

and to accept small crosstalk errors in $[E_R-E_y]$ and $[E_G-E_y]$. That is, if $\Delta\theta_B$ is postulated to be zero, then $\Delta\theta_R$ will be 30/57.3 radians, and $\Delta\theta_G$ will be 4.5/57.3 radians. It will be understood that, while $\Delta\theta_B$ has been assumed to be zero in the above discussion, satisfactory performance may be achieved by adjusting $\Delta\theta_B$ to some small finite value, thereby permitting $\Delta\theta_R$ and $\Delta\theta_G$ to take on values consistent with somewhat less crosstalk in those channels.

If $\Delta\theta_B$ is postulated as zero, the crosstalk in the $$[E_B-E_y]$$

channel will be zero, the crosstalk in the $[E_G-E_y]$ channel will be small, and the only significant crosstalk will be in the detection of $[E_R-E_y]$. In such a case, $[E_B-E_y]$ is detected properly, $[E_G+.02(E_B-E_R)-E_y]$ is detected in place of $[E_G-E_y]$, and $[E_R+.23(E_G-E_B)-E_y]$ is detected in place of $[E_R-E_y]$.

Figure 2:
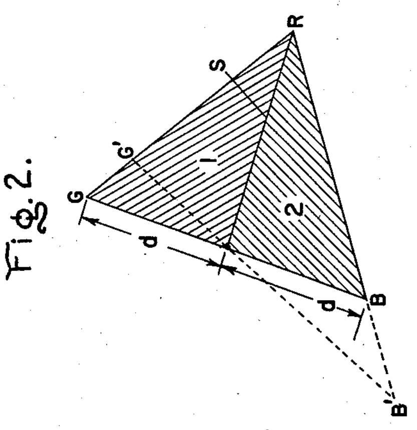
Fig. 2 is a color-triangle plot showing the effect of inaccuracy resulting from sampling a color television signal of the commonly accepted type.

Figure 2 shows a plot (based on the International Committee on Illumination color triangle) on which the effect of this crosstalk is graphically represented. (The color triangle is explained in Wintringham, "Color Television and Colorimetry," Proceedings of the Institute of Radio Engineers, vol. 39, No. 10, page 1135.) A study of the above mathematical expressions and of the color triangle results in the following observation as to the results of symmetrical sampling:

(1) Saturated red (i.e. red which contains no green or blue) will be reproduced correctly because $E_B=E_G=0$.

(2) Further, all colors for which $E_G=E_B$ will be reproduced nearly correctly because the crosstalk terms will go to zero. The locus of these colors is the straight line S in Figure 2.

(3) All other colors will be somewhat distorted because the crosstalk will be present. It should be noted that, although $(E_B-E_y)$ is postulated to be free of crosstalk, $E_B$ will nevertheless be distorted. Saturated green will be reproduced at the point $G^1$ rather than G, and saturated blue would be reproduced at the point $B^1$ instead of B, if colors outside the triangle could be reproduced. The over-all effect of the crosstalk may be summarized by saying that colors in area 1 will be reproduced nearer to saturated red than they should be, while colors in area 2 will be reproduced nearer to saturated blue than they should be.

The preceding discussion has assumed that $\Delta\theta_B$ is zero, from which the values of $\Delta\theta_G$ and $\Delta\theta_R$ are then established. It should be understood that similar results may be obtained if $\Delta\theta_B$ is adjusted to some small value not zero, in which case $\Delta\theta_R$ and $\Delta\theta_G$ may take on more favorable values than in the case discussed. Moreover, the preceding discussion has merely shown the need for the circuits of my invention and furnished a basis for the explanation of my invention per se, which will now follow.

It has been pointed out in the preceding paragraphs how $E_c$ may be sampled symmetrically so as to produce quantities proportional to $(E_B-E_y)$ without crosstalk and to produce quantities proportional to $(E_G-E_y)$ with small crosstalk and quantities proportional to $(E_R-E_y)$ with a substantial amount of crosstalk. However, no means has as yet been shown for eliminating the quantities proportional to $E_y$ from the above-mentioned quantities so that the sampling process may produce, without excessive inaccuracy, quantities proportional to $E_R$, $E_G$ and $E_B$ themselves. The difficulty inherent in eliminating the quantity proportional to $E_y$ from the quantities respectively proportional to $(E_R-E_y)$, $(E_G-E_y)$ and $(E_B-E_y)$ is that the factor of proportionality in each case is different, which means that no simple subtraction of the same amount from each quantity will suffice. The practice of my invention permits the quantity proportional to $E_y$ to be eliminated with reasonable accuracy. In effect, my invention provides for a quantity proportional to $E_y$ but modulated with a changing proportionality factor (changing according to which of the three channels is to be sampled) to be added to $E_m$ before the sampling takes place. Thus, voltages reasonably near proportionality to $E_R$, $E_G$ and $E_B$, and without $E_y$ therein, can be successively obtained by symmetrical sampling.

Figure 3:
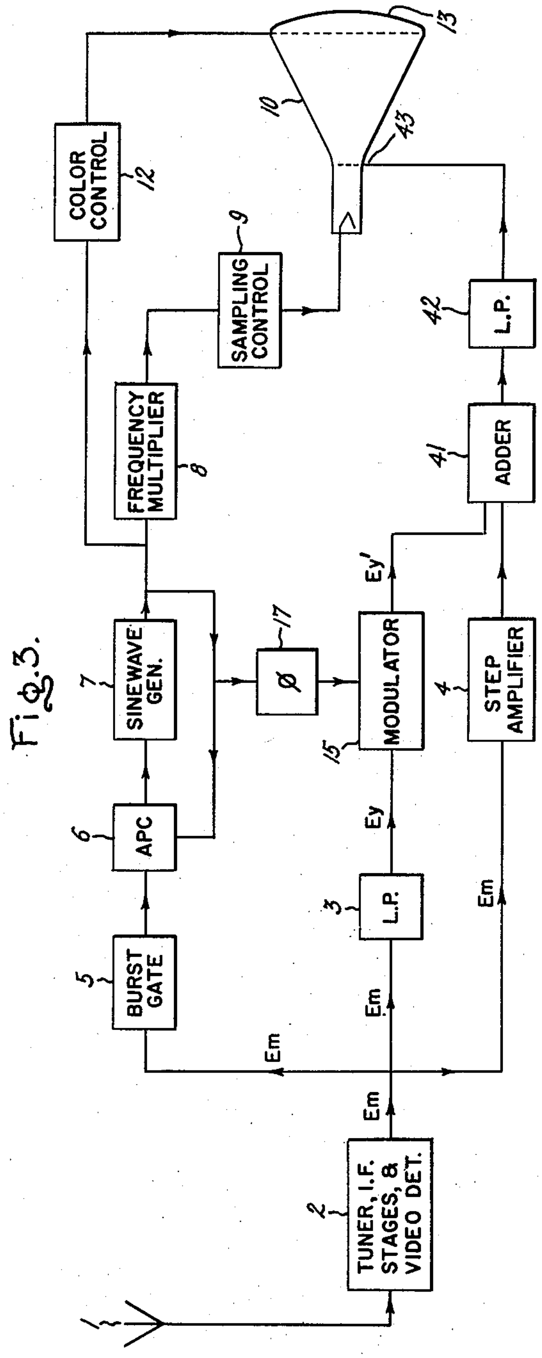
Fig. 3 is a schematic circuit diagram of a color television receiver embodying the circuits of my invention.

Turning to Figure 3, a possible physical embodiment capable of producing the above-described results will be discussed. Since all individual components may comprise apparatus well-known to those skilled in the art, the components are shown in simplified block form. The transmitted wave, including both video and audio information, is received by an antenna 1, from which the signal is fed to conventional tuner, intermediate-frequency stages, and a video detector (all represented by the block 2). The output of the video detector is the composite color signal $E_m$ as defined by Equations 1, 2, and 3 above. The composite color signal $E_m$ is then fed to a low-pass filter 3, a step amplifier 4, and a burst gate circuit 5. Low-pass filter 3 passes the luminance component $E_y$ but rejects most of the chrominance component $E_c$ of the composite signal. Since the frequency spectra of $E_y$ and $E_c$ overlap each other, a simple filter is not capable of accomplishing perfect separation thereof, but adequate performance may be obtained with a low-pass filter passing frequencies below 3 megacycles. This filter may be of any conventional design.

Step amplifier 4 may be of any well-known construction, such as the parallel combination of two band-pass filters, each in series with an amplifier of a different gain, and the amplifier outputs going in turn to an adder. What ever the construction, the characteristics of step amplifier 4 should be such that it supplies a gain in the neighborhood of 0.93 below a frequency of approximately 2.5 megacycles, and a gain in the neighborhood of unity above a frequency of approximately 3 megacycles, with a rather sharp transition between those frequencies. It will be apparent that, in this case, a step filter might well be substituted for the step amplifier, or, if extreme economy of construction is necessary, step amplifier 4 might even be replaced by a simple wire.

Burst gate circuit 5 derives from the composite signal $E_m$ a phase and frequency reference on the basis of which automatic phase-control circuit 6 and sinewave generator 7 reproduce the chrominance subcarrier wave $\omega$ as defined above. The subcarrier wave $\omega$ is supplied to a frequency multiplier 8 which produces a sampling wave to be employed by a sampling control circuit 9 in actuating a cathode ray tube 10 at the desired instants. The reproduced subcarrier wave also goes to color control circuit 12 which energizes color control electrode 13 to insure that the cathode-ray-tube beam strikes the proper phosphors on the screen at the proper time. The above-described circuitry (elements 5 through 13) may be of any suitable construction, and the details do not form part of my invention.

Figure 4:
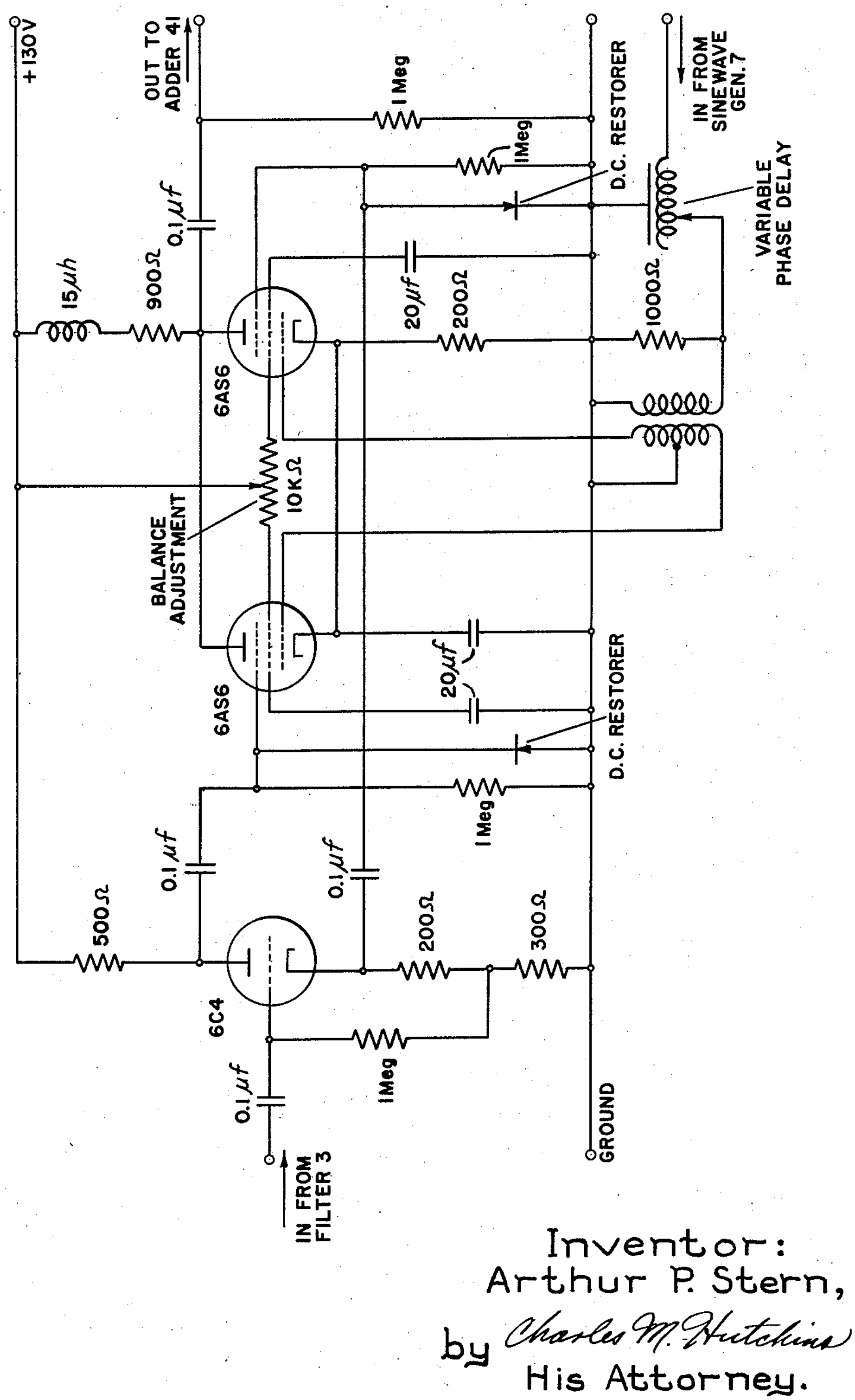
Fig. 4 is a detailed circuit diagram of a possible configuration of the modulator and associated phase shifter shown only schematically in Fig. 3.

As described above, low-pass filter 3 passes the luminance component $E_y$ while rejecting most of the chrominance component $E_c$ of the composite video signal. The output of low-pass filter 3 goes to a modulator 15, where $E_y$ is multiplied by a wave of subcarrier frequency $\omega$ which has undergone a suitable phase shift in phase shifter 17. It will be seen that phase shifter 17 is supplied from sineweave generator 7 and that the output of sinewave generator 7 is fed back to automatic-phase-control circuit 6 in order to provide a closed-loop system for controlling the phase (relative to the components of the subcarrier $\omega$) of the output of sinewave generator 7. Phase shifter 17 may be of any conventional construction and may have amplification or attenuation functions as well as phase-shifting functions. A satisfactory embodiment of phase shifter 17, together with modulator 15, is shown in Figure 4, wherein the circuitry below the ground line constitutes phase shifter 17, while the circuitry above the ground line constitutes balanced modulator 15. The input triode of the modulator is shown as a 6C4 having approximately equal resistances in its plate and cathode circuits, thus being in the nature of a so-called "phase splitter." While the output of the triode plate is coupled to one pentode of the modulator, the cathode of the triode is connected by means of a cathode-follower circuit to the other pentode of the modulator. The phase-shifter output is coupled to the control grids of the two pentodes in push-pull relationship, and the balance potentiometer between screen grids of the two pentodes is adjusted so that, for a zero input to the modulator from filter 3, there will be a zero output from the modulator to adder 41. It will be understood that the detailed circuitry of Figure 4 is exemplary only, and that any equivalent circuitry may be substituted therefor. Phase shifter 17 should shift the output of sinewave generator 7 so that it is 127/57.3 radians (127 degrees) ahead of the $(E_R-E_y)$ subcarrier and 217/57.3 radians (217 degrees) ahead of the $(E_B-E_y)$ subcarrier. The overall gain of modulator 15 should be approximately 0.54. It will be noted that the gains suggested in this specification for modulator 15 and step amplifier 4 may both be multiplied or divided by any number, as long as the ratio between them is maintained as specified.

It will likewise be noted that, in order to have a phase reference, it has been necessary to compare the phase of the sine wave applied in modulator 15 with the phase of one of the subcarrier waves in the modulator. This comparison necessarily involves a slight degree of approximation because of the tacit assumption that the time delay suffered by the vestiges of the subcarrier waves which get through low-pass filter 3 to modulator 15 does not differ greatly from the time delay suffered by the luminance component in reaching modulating 15 through filter 3. It will be understood that any small differences in time delay experienced by the signal passing through the modulator branch and the signal passing through the step-amplifier branch can be equalized by conventional means before reaching adder 41.

Returning to Figure 3, the outputs of modulator 15 and of step amplifier 4 are combined in an adder 41, which may be of any conventional construction. The output of adder 41 is fed through low-pass filter 42 to the control electrode 43 of the color picture tube. If adder 41 has peaking-circuit characteristics so as substantially to eliminate any extraneous second-harmonic components in the signal, then low-pass filter 42 may be eliminated. If used, low-pass filter 42 should pass no frequencies higher than approximately 5 megacycles.

It should be noted that, instead of using a step amplifier 4, it would be possible to substitute two simple bypass branches therefor. One of these simple bypass branches would include a high-pass filter and an amplifier such as to give the branch an over-all gain of 1.0, and would occupy a position in the circuit exactly like that of step amplifier 4. In such a case, the high-pass filter should pass no frequencies below approximately 3 megacycles. The other simple bypass branch would have a gain of 0.93 and would bypass modulator 15. That is, such a bypass branch would take $E_y$, the output of low-pass filter 3, and would operate upon said $E_y$ and feed the resulting signal to adder 41. Such a bypass branch might consist of a simple potentiometer voltage divider. In such a circuit arrangement, the operation is equivalent to that of the configuration of Figure 3 in that the modulation of $E_y$ by the phase-shifted subcarrier wave in modulator 15 results in a signal $E_y^1$ which, when recombined with the two bypassed signals, produces a signal practically devoid of $E_y$, which can then be sampled symmetrically without great inaccuracy.

The preceding paragraphs have disclosed and described apparatus capable of accurately eliminating the signal proportional to $E_y$ from the signals respectively proportional to $(E_R-E_y)$, $(E_G-E_y)$, and $(E_B-E_y)$. Any desired degree of accuracy in eliminating the $E_y$ signal may be obtained by the use of the parallel combination of modulator branch and bypass branch, as described. It has been implied that, despite the ability of the circuit to remove accurately the $E_y$ signal from the color-difference signals, the above-described system provides for only approximately correct reproduction of colors. This effect is a result of the fact that an inherently non-symmetrical system of vectors representing the transmission primaries is to be sampled symmetrically. However, this effect may be overcome, and perfect reproduction of colors can be achieved if the reproducing device employs suitably chosen reproducing primaries (i.e., phosphors) which differ from the primaries used in transmission. That is, the above-described circuits of my invention are capable of permitting perfect color reproduction if the phosphors (and hence the reproducing primaries) used in the picture tube are so chosen as to be representable by a symmetrical system of vectors, rather than by the unsymmetrical system of vectors which represent the transmission primaries as set forth in Equations 1, 2, and 3. If such phosphors, consistent with reproducing primaries representable by a symmetrical system of vectors, are employed in the picture tube, then symmetrical sampling of the signal output of adder 41 and filter 42 may be employed without causing any inaccuracy of color reproduction whatever.

While a specific embodiment has been shown and described, it will of course be understood that various modifications may be made without departing from the principles of my invention. Therefore, the appended claims are intended to cover any such modifications within the true spirit and scope of my invention.

What I claim as new and desire to secure by Letters Patent of the United States is:

1. A system for converting a color television signal of the type defined as the sum of a luminance component, a red color-difference chrominance component impressed upon a first subcarrier wave of frequency substantially 3.58 megacycles per second, and a blue color-difference chrominance component impressed upon a second subcarrier wave of equal frequency but ninety-degree phase displacement behind said first subcarrier wave, said system comprising first means for deriving said signal, second means for deriving a wave of sub-carrier frequency, and at least two circuit branches, a first one of said circuit branches including a modulator coupled to said first and second means for multiplying said luminance component of said color television signal by a wave of subcarrier frequency at a phase displaced substantially 127° ahead with respect to the first subcarrier wave thereof, said modulator having an over-all gain of substantially 0.54, said remaining circuit branches being coupled to said first means and including frequency-responsive amplitude-changing means having an over-all gain of substantially 0.93 below a frequency of 2.5 megacycles per second and of substantially 1.0 above a frequency of 3 megacycles per second, and an adder, the outputs of said first one of said circuit branches and of said remaining circuit branches being connected to said adder.

2. A system for converting a color television signal of the type defined as the sum of a luminance component, a red color-difference chrominance component impressed on a first subcarrier wave of frequency substantially 3.58 megacycles per second, and a blue color-difference chrominance component impressed upon a second subcarrier wave of equal frequency but ninety-degree phase displacement behind said first subcarrier wave, said system comprising first means for deriving a wave of sub-carrier frequency, and at least two circuit branches, means for supplying said color television signal to each of said branches, a first one of said circuit branches including a low-pass filter passing only signals of frequencies substantially below 3 megacycles per second for deriving said luminance components, and a modulator coupled to the output of said low pass filter and to said first means for multiplying said luminance component by a wave of subcarrier frequency at a phase displaced substantially 127° ahead with respect to the first subcarrier wave thereof, said modulator having an over-all gain of substantially 0.54, said remaining circuit branches including frequency-responsive amplitude-changing means having an over-all gain of substantially 0.93 below a frequency of 2.5 megacycles per second and of substantially 1.0 above a frequency of 3 megacycles per second, and an adder, the outputs of said first one of said circuit branches and of said remaining circuit branches being connected to said adder.

3. A system for converting a color television signal of the type defined as the sum of a luminance component, a red color-difference chrominance component impressed upon a first subcarrier wave of frequency substantially 3.58 megacycles per second, and a blue color-difference chrominance component impressed upon a second subcarrier wave of equal frequency but ninety-degree phase displacement behind said first subcarrier wave, said system comprising first means for deriving a wave of sub-carrier frequency, and at least two circuit branches, means for supplying said color television signal to each of said branches, a first one of said circuit branches including a low-pass filter passing only frequencies substantially below 3 megacycles per second for deriving said luminance component, and a modulator coupled to the output of said low pass filter and to said first means for multiplying said luminance component by a wave of subcarrier frequency at a phase displaced substantially 127° ahead with respect to the first subcarrier wave thereof, said modulator having an over-all gain of substantially 0.54, said remaining circuit branches including frequency-responsive amplitude-changing means having an over-all gain of substantially 0.93 below a frequency of 2.5 megacycles per second and of substantially 1.0 above a frequency of 3 megacycles per second, and a series combination of an adder and a low-pass filter, the outputs of said first one of said circuit branches and of said remaining circuit branches being connected to said series combination of an adder and a low-pass filter, said low-pass filter passing substantially no frequencies higher than 5 megacycles per second.

4. A system for converting a color television signal of the type defined as the sum of a luminance component, a red color-difference chrominance component impressed upon a first subcarrier wave of frequency substantially 3.58 megacycles per second, and a blue color-difference chrominance component impressed upon a second subcarrier wave of equal frequency but ninety-degree phase displacement behind said first subcarrier wave, said system comprising first means for deriving a wave of subcarrier frequency, and at least two circuit branches, means for supplying said color television signal to each of said branches, a first one of said circuit branches including a low-pass filter passing only signals of frequencies substantially below 3 megacycles per second for deriving said luminance component, and a modulator coupled to the output of said low pass filter and to said first means for multiplying said luminance component by a wave of subcarrier frequency at a phase displaced substantially 127° ahead with respect to the first subcarrier wave thereof, said modulator having an over-all gain of substantially 0.54, and being by-passed by an amplifier having a gain of substantially 0.93, said remaining circuit branches including the series combination of a high-pass filter and an amplifier giving said series combination an over-all gain of unity, said high-pass filter passing substantially no frequencies below 3 megacycles per second, and a series combination of an adder and a low-pass filter, the outputs of said first one of said circuit branches and of said remaining circuit branches being connected to said series combination of an adder and a low-pass filter, said low-pass filter passing substantially no frequencies higher than 5 megacycles per second.

5. A system for modifying a composite color television signal, said composite color television signal comprising a luminance component and at least one chrominance component, said chrominance component having been impressed on a sub-carrier wave, said system including at least two parallel branches, means for applying said composite color television signal to each of said branches, a first one of said parallel branches including low-pass filter means for extracting said luminance component from said composite color television signal and modulator means for multiplying said luminance component by a wave having a frequency substantially equal to that of said chrominance component subcarrier wave and of a predetermined phase with respect thereto, a second one of said parallel branches bypassing said first parallel branch and having a predetermined transmission gain with respect thereto, and a signal adder excited from the output end of each of said parallel branches.

6. A system for modifying a composite color television signal, said composite color television signal comprising a luminance component and at least one chrominance component, said chrominance component having been impressed on a subcarrier wave, said system including at least two parallel branches, means for applying said composite color television signal to each of said branches, a first one of said parallel branches including low-pass filter means for extracting said luminance component from said composite color television signal and modulator means for multiplying said luminance component by a wave having a frequency substantially equal to that of said chrominance component subcarrier wave and of a predetermined phase, a second one of said parallel branches bypassing said first parallel branch, said second one of said parallel branches including frequency-responsive amplitude-changing means, and a signal adder excited from the output end of each of said parallel branches.

7. A system for modifying a composite color television signal, said composite color television signal comprising a luminance component and at least one chrominance component, said chrominance component having been impressed on a subcarrier wave, said system including at least two parallel branches, means for applying said composite color television signal to each of said branches, a first one of said parallel branches including modulator means for multiplying said luminance component by a wave having a frequency substantially equal to that of said chrominance component subcarrier wave and of a predetermined phase thereto, a second one of said parallel branches bypassing said first parallel branch and having a predetermined transmission gain with respect thereto, and a signal adder excited from the output end of each of said parallel branches.

8. A system for modifying a composite color television signal, said composite color television signal comprising a luminance component and at least one chrominance component, said chrominance component having been impressed on a subcarrier wave, said system including at least two parallel branches, means for applying said composite color television signal to each of said branches, a first one of said parallel branches including low-pass filter means for extracting said luminance component from said composite color television signal and modulator means for multiplying said luminance component by a wave having a frequency substantially equal to that of said chrominance component subcarrier wave and of predetermined phase with respect thereto, a second one of said parallel branches bypassing said first parallel branch and having a predetermined transmission gain with respect thereto, said second one of said parallel branches including step-filter means, and a signal adder excited from the output end of each of said parallel branches.

9. A system for modifying a composite color television signal, said composite color television signal comprising a luminance component and at least one chrominance component, said chrominance component having been impressed on a subcarrier wave, said system including at least two parallel branches, means for applying said composite color television signal to each of said branches, a first one of said parallel branches including low-pass filter means for extracting said luminance component from said composite color television signal and modulator means for multiplying said luminance component by a wave having a frequency substantially equal to that of said chrominance component subcarrier wave and of predetermined phase with respect thereto, a second one of said parallel branches bypassing said first parallel branch and having a predetermined transmission gain with respect thereto, said second one of said parallel branches including step-amplifier means, and a signal adder excited from the output end of each of said parallel branches.

10. A system for modifying a composite color television signal, said composite color television signal comprising a luminance component and at least one chrominance component, said chrominance component having been impressed on a subcarrier wave, said system including at least two parallel branches, means for applying said composite color television signal to each of said branches, a first one of said parallel branches including low-pass filter means for extracting said luminance component from said composite color television signal and modulator means for multiplying said luminance component by a wave having a frequency substantially equal to that of said chrominance component subcarrier wave and of predetermined phase with respect thereto, a second one of said parallel branches bypassing said first parallel branch and having a predetermined transmission gain with respect thereto, said second one of said parallel branches including frequency-responsive amplitude-changing means, and a signal adder excited from the output end of each of said parallel branches, said signal adder being coupled to a color television picture tube for excitation thereof.

11. A system for modifying a composite color television signal, said composite color television signal comprising a luminance component and at least one chrominance component, said chrominance component having been impressed on a subcarrier, said system including at least two parallel branches, means for applying said composite color television signal to each of said branches, a first one of said parallel branches including low-pass filter means for extracting said luminance component from said composite color television signal and modulator means for multiplying said luminance component by a wave having a frequency substantially equal to that of said chrominance component subcarrier, said wave being supplied to said modulator means by phase-shifting means governing the phase of said wave at a predetermined value with respect to the carrier of said chrominance component, a second one of said parallel branches bypassing said first parallel branch and having a predetermined transmission gain with respect thereto, said second one of said parallel branches including frequency-responsive amplitude-changing means, and a signal adder excited from the output end of each of said parallel branches.

References Cited in the file of this patent

UNITED STATES PATENTS

| | | |
|---|---|---|
| 2,734,940 | Loughlin | Feb. 14, 1956 |
| 2,744,952 | Lawrence | May 8, 1956 |
| 2,759,993 | Loughlin | Nov. 21, 1956 |